US011374458B2

(12) United States Patent
Johansen

(10) Patent No.: US 11,374,458 B2
(45) Date of Patent: Jun. 28, 2022

(54) ELECTRIC MOTOR WITH FLUID COOLING

(71) Applicant: DEKALB BLOWER INC., Yorkville, IL (US)

(72) Inventor: Eric J. Johansen, Newark, IL (US)

(73) Assignee: DEKALB BLOWER INC., Yorkville, IL (US)

( * ) Notice: Subject to any disclaimer, the term of this patent is extended or adjusted under 35 U.S.C. 154(b) by 170 days.

(21) Appl. No.: 16/726,711

(22) Filed: Dec. 24, 2019

(65) Prior Publication Data

US 2020/0328649 A1 Oct. 15, 2020

Related U.S. Application Data

(60) Provisional application No. 62/750,053, filed on Oct. 24, 2018.

(51) Int. Cl.
 *H02K 5/20* (2006.01)
 *H02K 9/193* (2006.01)
 *H02K 9/06* (2006.01)

(52) U.S. Cl.
 CPC .............. *H02K 5/20* (2013.01); *H02K 5/203* (2021.01); *H02K 9/06* (2013.01); *H02K 9/193* (2013.01)

(58) Field of Classification Search
 CPC ............ H02K 5/20; H02K 9/19; H02K 9/193; H02K 5/203; H02K 5/207
 See application file for complete search history.

(56) References Cited

U.S. PATENT DOCUMENTS

| | | |
|---|---|---|
| 1,730,372 A | 10/1929 | Lawrie |
| 2,106,841 A | 2/1938 | Baker |
| 2,237,451 A | 4/1941 | Samuels |
| 2,424,501 A | 7/1947 | Place |
| 2,473,813 A | 6/1949 | Nygren |
| 2,653,755 A | 9/1953 | Kruhmin |
| 3,275,223 A | 9/1966 | Fowell |
| 3,401,871 A | 9/1968 | Crowe |
| 3,907,307 A | 9/1975 | Maurer et al. |
| 3,943,717 A | 3/1976 | Schexnayder |
| 4,040,769 A | 8/1977 | Britz |

(Continued)

FOREIGN PATENT DOCUMENTS

EP 0631365 A2 * 12/1994 ............... H02K 5/20

OTHER PUBLICATIONS

Garden City Fan & Blower Co., "PF2 Propeller. Plug Units," Bulletin PF681C 1982, p. 13.

*Primary Examiner* — Quyen P Leung
*Assistant Examiner* — Eric Johnson
(74) *Attorney, Agent, or Firm* — von Briesen & Roper, s.c.

(57) ABSTRACT

The present disclosure relates to electric motors having fluid cooling by fluid flow through a cooling jacket cavity. An electric motor may include a cylindrical housing wall, a stator mounted to an inner surface of the housing wall, a motor shaft mounted for rotation within the housing wall, and a cooling jacket wall surrounding and concentric with the housing wall. A housing wall outer surface and a jacket wall inner surface define the cooling jacket cavity, and the cooling jacket wall has a fluid inlet port and a fluid outlet port. Cooling fluid flows into the cooling jacket cavity through the fluid inlet, flows through the cooling jacket cavity over the housing wall outer surface, and flows out of the cooling jacket cavity through the fluid outlet.

19 Claims, 12 Drawing Sheets

(56) References Cited

U.S. PATENT DOCUMENTS

| | | |
|---|---|---|
| 4,253,483 A | 3/1981 | Cornelius |
| 4,373,509 A | 2/1983 | Neitzel et al. |
| 4,508,486 A | 4/1985 | Tinker |
| 4,534,569 A | 8/1985 | Ishitani et al. |
| 4,664,362 A | 5/1987 | Hennells |
| 4,775,294 A | 10/1988 | LaPorte |
| 4,844,479 A | 7/1989 | Ueda et al. |
| 4,957,414 A | 9/1990 | Willingham |
| 5,006,064 A | 4/1991 | Freund |
| 5,083,904 A | 1/1992 | Masatsugu et al. |
| 5,127,798 A | 7/1992 | Campolmi |
| 5,171,128 A | 12/1992 | Williamson et al. |
| 5,238,453 A | 8/1993 | Heil |
| 5,246,343 A | 9/1993 | Windsor et al. |
| 5,437,541 A | 8/1995 | Vainrub |
| 5,567,380 A | 10/1996 | Hoover |
| 5,588,803 A | 12/1996 | Vetter et al. |
| 5,636,688 A | 6/1997 | Bassinger |
| 5,648,694 A * | 7/1997 | Kobayashi .......... F04D 13/0686 310/87 |
| 5,673,681 A | 10/1997 | Neitzel et al. |
| D393,708 S | 4/1998 | Haeck |
| 5,809,993 A | 9/1998 | Neitzel et al. |
| D405,170 S | 2/1999 | Haeck |
| 5,879,815 A | 3/1999 | Schotz |
| 5,894,737 A | 4/1999 | Haeck |
| 5,915,960 A | 6/1999 | Check et al. |
| 6,033,183 A | 3/2000 | Genster |
| 6,050,258 A | 4/2000 | Neitzel et al. |
| 6,065,936 A | 5/2000 | Shingai et al. |
| 6,156,090 A | 12/2000 | Ishikawa et al. |
| 6,251,153 B1 | 6/2001 | Neitzel et al. |
| 6,457,550 B1 | 10/2002 | Barry et al. |
| 6,505,502 B1 | 1/2003 | Brownell et al. |
| 6,644,337 B2 | 11/2003 | Heil |
| 6,726,454 B2 | 4/2004 | Blass et al. |
| 6,759,774 B1 * | 7/2004 | Griggs .................. H02K 5/124 310/87 |
| 6,797,041 B2 | 9/2004 | Brownell et al. |
| 6,994,743 B2 | 2/2006 | Brownell et al. |
| 7,018,289 B2 | 3/2006 | Heil et al. |
| 7,049,499 B1 | 5/2006 | Mathson et al. |
| 7,320,636 B2 | 1/2008 | Seliger et al. |
| 7,547,249 B2 | 6/2009 | Seliger et al. |
| 7,682,231 B2 | 3/2010 | Enzenroth et al. |
| 7,758,305 B2 | 7/2010 | Kurszewski et al. |
| 7,951,226 B2 | 5/2011 | Stanton et al. |
| 8,025,477 B2 | 9/2011 | Ganesh et al. |
| 8,100,407 B2 | 1/2012 | Stanton et al. |
| 8,221,082 B2 | 7/2012 | Key |
| 8,758,101 B2 | 6/2014 | Khalitov et al. |
| 8,932,013 B2 | 1/2015 | Khalitov et al. |
| 8,939,646 B2 | 1/2015 | Forrest |
| 9,004,868 B2 | 4/2015 | Rhodes |
| 9,109,605 B2 | 8/2015 | Chou |
| 9,182,131 B1 | 11/2015 | Prasser et al. |
| 9,505,092 B2 | 11/2016 | Brownell et al. |
| 9,523,371 B2 | 12/2016 | Hollan et al. |
| 10,054,130 B1 | 8/2018 | Johansen |
| 10,356,943 B2 | 7/2019 | Johansen |
| 10,605,258 B2 | 3/2020 | Johansen |
| 10,605,262 B2 | 3/2020 | Johansen |
| 10,935,040 B2 | 3/2021 | Johansen |
| 2002/0086574 A1 | 7/2002 | Vinson et al. |
| 2004/0254037 A1 | 12/2004 | Williamson et al. |
| 2005/0111972 A1 | 5/2005 | Penlesky et al. |
| 2005/0143001 A1 | 6/2005 | Merlet et al. |
| 2005/0159101 A1 | 7/2005 | Hrdina et al. |
| 2005/0204582 A1 | 9/2005 | Rossi et al. |
| 2007/0202795 A1 | 8/2007 | Seliger et al. |
| 2008/0030085 A1 * | 2/2008 | Gizaw ..................... H02K 5/20 310/54 |
| 2011/0067836 A1 | 3/2011 | Tang et al. |
| 2011/0155345 A1 | 6/2011 | Li |
| 2011/0317362 A1 | 12/2011 | Chen |
| 2012/0156019 A1 | 6/2012 | Gong et al. |
| 2012/0322358 A1 | 12/2012 | Wendorski et al. |
| 2013/0169077 A1 * | 7/2013 | Takei ..................... H02K 5/20 310/54 |
| 2013/0189131 A1 * | 7/2013 | Huang .......................... 417/366 |
| 2013/0342046 A1 * | 12/2013 | Hyun ..................... H02K 5/20 310/54 |
| 2014/0241868 A1 | 8/2014 | Brownell et al. |
| 2014/0241894 A1 | 8/2014 | Brownell et al. |
| 2015/0037154 A1 | 2/2015 | Hall et al. |
| 2015/0086349 A1 | 3/2015 | Ganesh et al. |
| 2015/0176603 A1 | 6/2015 | Fetting et al. |
| 2015/0267713 A1 | 9/2015 | Robinson et al. |
| 2015/0345512 A1 | 12/2015 | Robinson et al. |
| 2016/0061222 A1 | 3/2016 | Robinson et al. |
| 2016/0138606 A1 | 5/2016 | Barry |
| 2016/0161133 A1 | 6/2016 | Oh |
| 2016/0356278 A1 | 12/2016 | Khalitov et al. |
| 2016/0356287 A1 | 12/2016 | Khalitov et al. |
| 2018/0212494 A1 * | 7/2018 | Schochlow .............. H02K 9/19 |

* cited by examiner

US 11,374,458 B2

ELECTRIC MOTOR WITH FLUID COOLING

CROSS-REFERENCE TO RELATED APPLICATION

This application claims priority to U.S. Provisional Patent Application Ser. No. 62/750,053, filed on Oct. 24, 2018, which application is expressly incorporated by reference herein.

TECHNICAL FIELD

The present disclosure relates generally to industrial electric motors and, more particularly, to industrial electric motors for high temperature environments that are cooled by fluid flow over an electric motor housing.

BACKGROUND

Electric motors are used in industrial applications to create airflow for processes such as combustion, ventilation, aeration, particulate transport, exhaust, cooling, air-cleaning, drying and air recirculation. Airflow is created by rotating an impeller having a plurality of blades to create the desired circulation of air within the operating environment. Typically, an industrial electric motor includes an external motor housing, internal components within the housing such as a stator and a rotor, and a motor shaft extending out of the motor housing. The impeller is mounted on or otherwise operatively connected to the motor shaft so that rotation of the motor shaft causes rotation of the impeller to generate the airflow. In many high temperature environment applications, the motor housing is mounted to an exterior wall or roof of the high temperature environment with the motor shaft extending through the wall or roof and the impeller being disposed within the high temperature environment.

The components of the industrial electric motors are subjected to loads and stresses during the operation in high temperature environments. Thermal stresses along with the normal loads and stresses of operating electric motors can cause damage to the components that will reduce the efficiency of the electric motor or cause complete failure. The high temperature environments can also subject the components to contaminants that may corrode the components or otherwise damage the components so that the electric motors do not operate at their optimal efficiencies. Ultimately, the additional thermal stresses and other adverse conditions can result in earlier fatigue failure of the industrial electric motor and more frequent need for replacement of components in high temperature environments as the components endure numerous thermal cycles from processes, and in corrosive environments due to exposure to harmful chemicals, than when operating in environments that do not cause the same level of thermal stresses or corrosive exposure on the components. Moreover, when operating on a variable drive frequency (VFD) controller, an electric motor may have an excessive turndown ratio that can cause the internal components of the motor to run much hotter at lower frequency, thus causing an overheating condition where the motor is not be able to dissipate the additional heat through the motor housing through traditional convective or conductive cooling methods.

SUMMARY OF THE DISCLOSURE

In one aspect of the present disclosure, an electric motor is disclosed. The electric motor may include a housing wall having a cylindrical shape, a housing wall inner surface and a housing wall outer surface, a stator mounted to the housing wall inner surface, a motor shaft mounted for rotation within the housing wall, and a cooling jacket wall surrounding and concentric with the housing wall and having a jacket wall inner surface and a jacket wall outer surface. The housing wall outer surface and the jacket wall inner surface may define a cooling jacket cavity, the cooling jacket wall may have a fluid inlet and a fluid outlet, and cooling fluid may flow into the cooling jacket cavity through the fluid inlet, flow through the cooling jacket cavity over the housing wall outer surface and flow out of the cooling jacket cavity through the fluid outlet.

In another aspect of the present disclosure, an electric motor is disclosed. The electric motor may include a housing wall having a cylindrical shape, a housing wall inner surface and a housing wall outer surface, a stator mounted to the housing wall inner surface, a motor shaft mounted for rotation within the housing wall, a cooling jacket wall surrounding and concentric with the housing wall and having a jacket wall inner surface and a jacket wall outer surface, a first jacket end wall connected to the jacket wall proximate a first jacket wall end and to the housing wall, and a second jacket end wall connected to the jacket wall proximate a second jacket wall end and to the housing wall. The housing wall outer surface, the jacket wall inner surface, the first jacket end wall and a second jacket end wall may define a cooling jacket cavity, and the cooling jacket wall has a fluid inlet port proximate the first jacket end wall and a fluid outlet port proximate the second jacket end wall, and cooling fluid may flow into the cooling jacket cavity through the fluid inlet port, flow through the cooling jacket cavity over the housing wall outer surface and flow out of the cooling jacket cavity through the fluid outlet port.

In a further aspect of the present disclosure, an electric motor is disclosed. The electric motor may include a housing wall having a cylindrical shape, a housing wall inner surface and a housing wall outer surface, a stator mounted to the housing wall inner surface, a motor shaft mounted for rotation within the housing wall, a cooling jacket wall surrounding and concentric with the housing wall and having a jacket wall inner surface and a jacket wall outer surface, wherein the housing wall outer surface and the jacket wall inner surface define a cooling jacket cavity, and a cooling fan mounted at an open end of the jacket wall and upstream from the housing wall to discharge air into the cooling jacket cavity. The air discharged from the cooling fan may flow longitudinally through the cooling jacket cavity and along the housing wall outer surface.

Additional aspects are defined by the claims of this patent.

DETAILED DESCRIPTION

The present disclosure is directed to electric motors having housings and other features for causing fluid flow around the electric components to remove heat during operation. The electric motors in accordance with the present disclosure have particular application in high temperature environments where the electric motors drive impellers to create airflow within the high temperature environments. The housing of the electric motor may be mounted to an exterior surface such as a wall or roof of the high temperature environment with a shaft extending into the high temperature and/or corrosive environment where the impeller will be located. Heat may still be communicated from the high temperature to the electric motor housing where the cooling jackets and other components in accordance with the present disclosure remove heat to protect the internal components of the electric motor.

Figure 1:
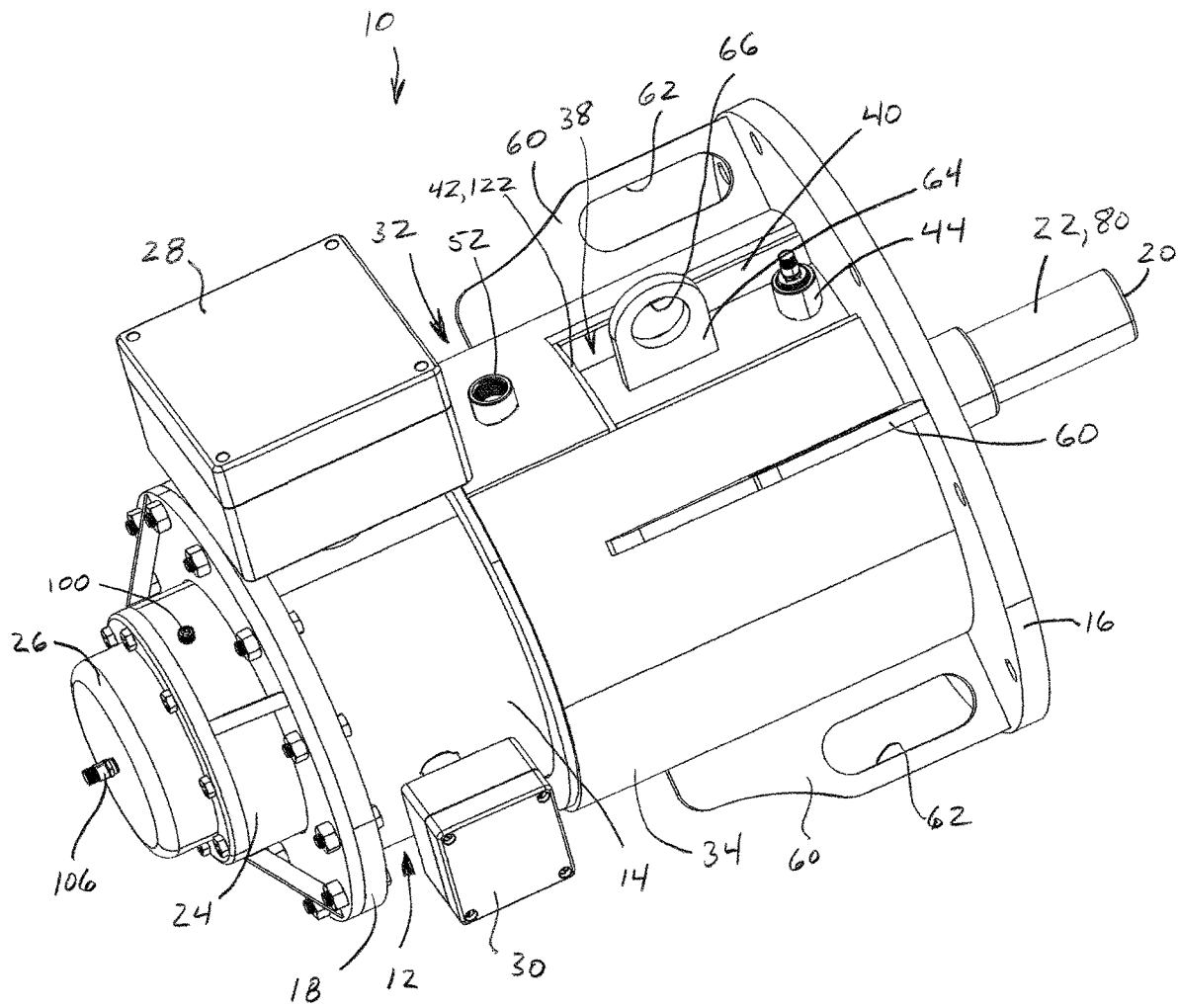
FIG. 1 is an isometric view of an electric motor including an embodiment of fluid cooling in accordance with the present disclosure.
Figure 2:
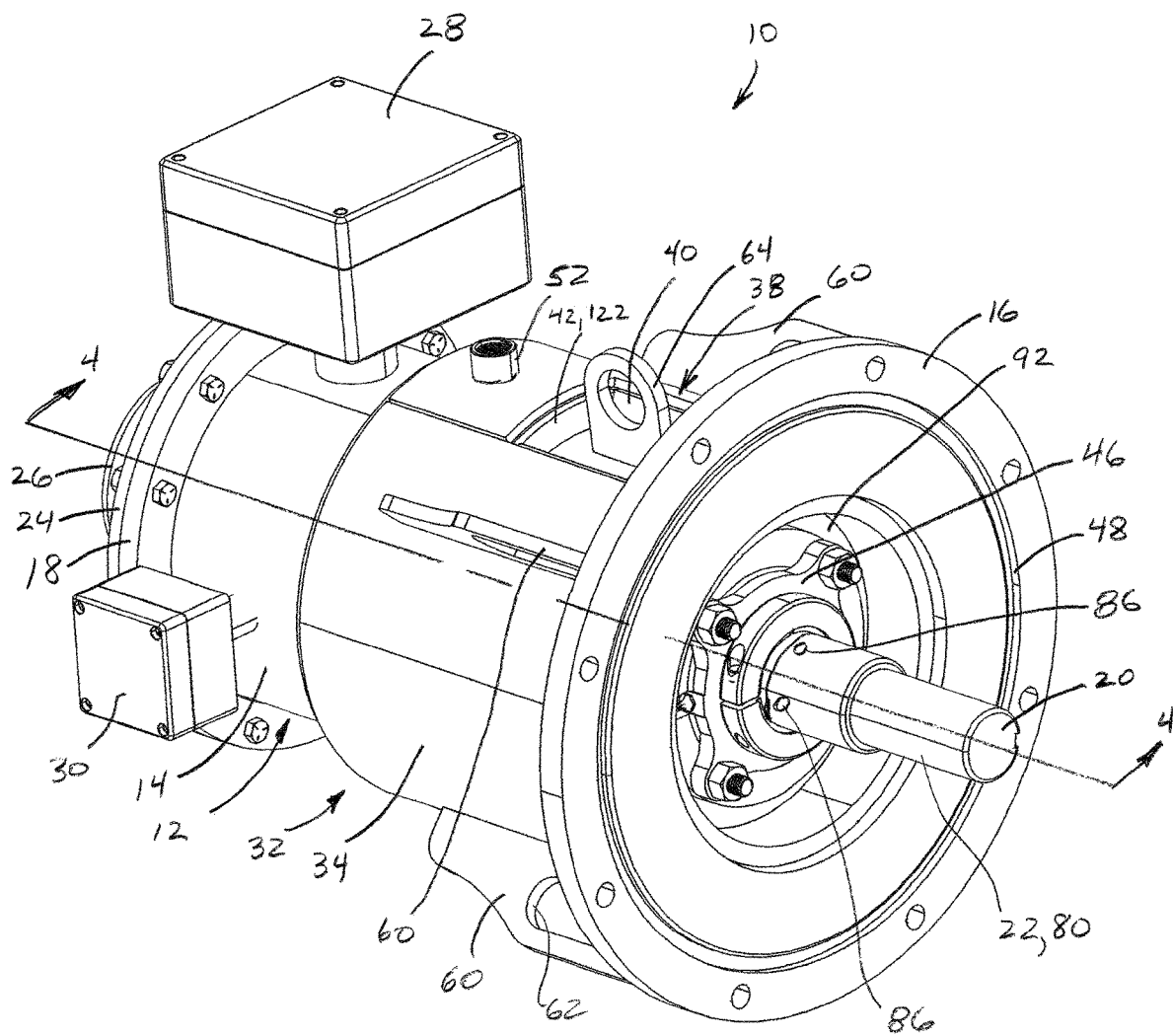
FIG. 2 is a second isometric view of the electric motor of FIG. 1.
Figure 3:
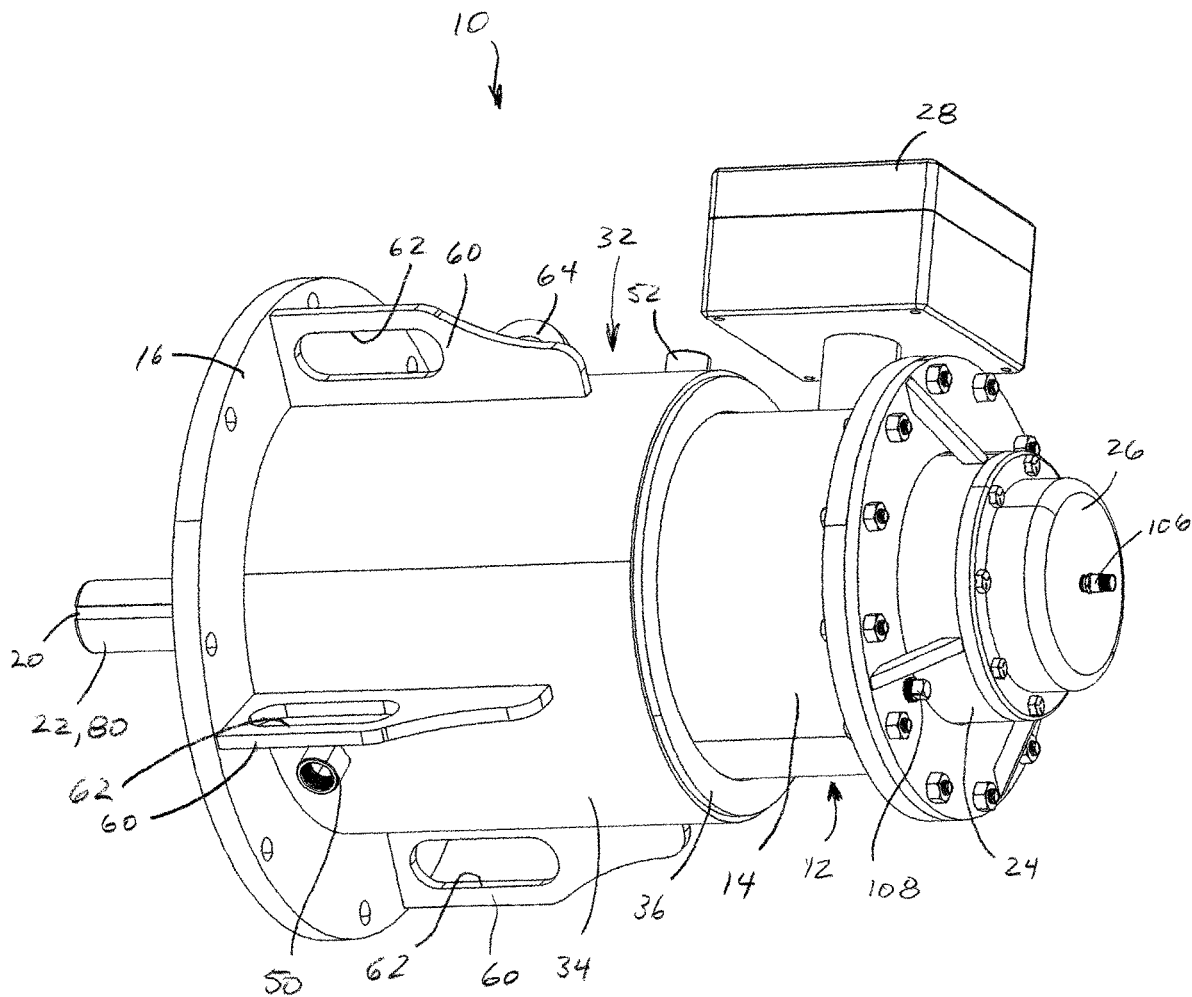
FIG. 3 is a third isometric view of the electric motor of FIG. 1.

FIGS. 1-3 illustrate isometric views of a first embodiment of an electric motor 10 with fluid cooling in accordance with the present disclosure. The electric motor 10 may be a standard 3 phase A/C induction motor and may include a motor housing 12 enclosing the electrical components discussed later in the present application. The motor housing 12 includes a housing wall 14 with a first or mounting flange 16 at a first end and a second or closed end flange 18 at an opposite end. The flanges 16, 18 may be integrally formed at the corresponding ends of the housing wall 14, or welded or otherwise connected to the ends to from substantially air- and water-tight connections so gases and fluids cannot leak into or out of the motor housing 12 at the interfaces between the housing wall 14 and the flanges 16, 18. The mounting flange 16 is annular and configured for connection to a wall or roof (not shown) of a high temperature environment with a shaft end 20 of a motor shaft 22 extending through the mounting flange 16 and into the high temperature environment for attachment of an impeller (not shown) that will be driven by the electric motor 10 to create airflow within the high temperature environment. The second flange 18 is configured for attachment of an end bell 24 and an end cap 26 to close off the motor housing as discussed more fully below. The motor housing 12 may further include a wire terminal box 28 for the electrical connections between the motor components and a power source and controls (not shown) for the electric motor 10, and a thermostat box 30 for a thermostat (not shown) that may measure the internal temperature of the motor housing 12 to provide feedback for detecting overheating conditions that may happen in the case of power outages for the cooling liquid supply, water flow shortages or other cooling medium disruptions.

Cooling of the motor housing 12 is provided by a cooling jacket 32 that surrounds the housing wall 14 to facilitate fluid flow over the housing wall 14 to remove heat from the motor housing 12. The interior of the cooling jacket 32 includes a cylindrical jacket wall 34 surrounding and concentrically aligned with the housing wall 14. The jacket wall 34 may be integrally formed with, or welded or otherwise connected to the mounting flange 16 to form an air- and water-tight seal there between. At an end opposite the mounting flange 16, an annular jacket end wall 36 extends from the end of the jacket wall 34 to the housing wall 14 and is connected thereto to close off the end of the cooling jacket 32. In the illustrated embodiment, the jacket wall 34 includes a cutout portion 38 extending from the mounting flange 16 and providing access to a corresponding portion of the housing wall 14. The cooling jacket 32 is closed in the area of the cutout portion 38 by a pair of cutout side walls 40 and a cutout end wall 42. The cutout portion 38 may provide access for installation of a grease fitting 44 proximate the mounting flange 16 to provide lubrication to a fixed shaft bearing 46 (FIG. 2) without the necessity of opening the motor housing 12 or detaching the electric motor 10 to gain access to the fixed shaft bearing 46 through a central circular opening 48 of the mounting flange 16.

Access for the cooling fluid to the cooling jacket 32 is provided by a fluid inlet port 50 (FIG. 3) and a fluid outlet port 52 (FIGS. 1 and 2) in the jacket wall 34. The fluid inlet port 50 is located proximate the mounting flange 16 in an area that is most proximate to the heat from the high temperature environment. The fluid inlet port 50 is also proximate a lowest portion of the motor housing 12 when the electric motor 10 is mounted with the motor shaft 22 horizontal and the wire terminal box 28 on top of the motor housing 12. Being positioned proximate the mounting flange 16, the fluid inlet port 50 is also proximate the lowest point of the motor housing 12 when the electric motor 10 is oriented with the end 20 of the motor shaft 22 extending vertically downward, such as when the electric motor 10 is installed on a roof of a high temperature environment.

The fluid outlet port 52 is located proximate the jacket end wall 36 and on the same side of the motor housing 12 as the wire terminal box 28. Positioned as shown, the fluid outlet port 52 is disposed proximate the top of the motor housing 12 and the cooling jacket 32, and above the fluid inlet port 50 whether the electric motor 10 is oriented horizontally with the wire terminal box on top or vertically with the motor shaft 22 extending downward. With this arrangement, air pockets within the cooling jacket 32 that can reduce the thermal efficiency of the cooling jacket 32 may be virtually eliminated as discussed further below.

To facilitate orienting the electric motor 10 horizontally or vertically as discussed above for installation, a plurality of lifting gussets 60 are circumferentially spaced about the cooling jacket 32 proximate the mounting flange 16. The lifting gussets 60 may be welded to the outer surface of the jacket wall 34 and to the mounting flange 16, thereby providing structural reinforcement for the mounting flange 16 in addition to being points of attachment for lifting elements. The lifting gussets 60 may each include a connection aperture 62 for attachment of hooks, chain, cables, ropes or other lifting elements. An additional lifting gusset 64 with a connection aperture 66 may be welded to the housing wall 14 within the cutout portion 38 of the jacket wall 34.

Figure 4:
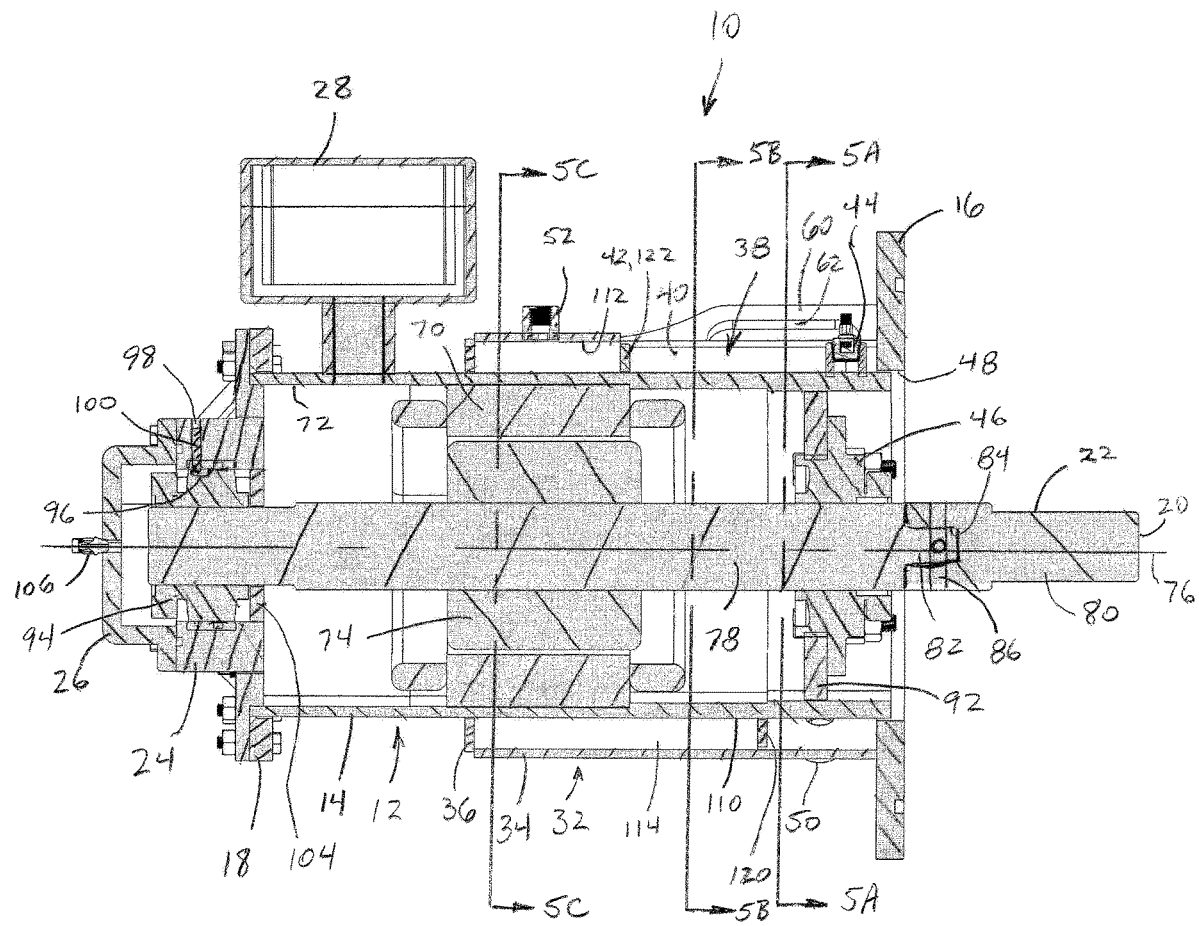
FIG. 4 is a cross-sectional view of the electric motor of FIG. 1 taken through line 4-4 of FIG. 2.

The interior of the electric motor 10 is illustrated in detail in the cross-sectional view of FIG. 4. The electrical components of the electric motor 10 are installed within the housing wall 14. A stator 70 is mounted to a housing wall inner surface 72 and is held stationary relative to the housing wall 14. A rotor 74 is mounted on and rotates with the motor shaft 22 about a shaft longitudinal axis 76. The operation of the stator 70 and the rotor 74 to drive the motor shaft 22 and attached impeller is conventional for a 3 phase A/C induction motor as is known to those skilled in the art.

The motor shaft 22 has different operating requirements within the motor housing 12 and within the high temperature environment. Within the motor housing 12, the motor shaft 21 must be electrically conductive so as to not interfere with the magnetic field and current flow of the stator 70 and the rotor 74. Outside the motor housing 12 and proximate to and within the high temperature environment, the motor shaft 22 must be resistant to high temperatures. To accommodate both sets of operating conditions, the motor shaft 22 may be provided with a two-piece construction. A motor housing shaft portion 78 within the motor housing 12 may be fabricated from a conductive material such as 1018 or 1045 carbon steel or similar conductive material. An exterior shaft portion 80 external to the motor housing 12 may be fabricated from a non-conductive, high temperature resistant material such as 300 series stainless steel alloys (approximate melting point=2750° F.), nickel steel alloys (approximate melting point=2647° F.), chromium steel (approximate melting point=3380° F.) or similar materials having melting points of approximately 2200° F. or higher. While the centrifugal forces applied from the impeller rotating on the motor shaft 22, the material of the exterior shaft portion 80 may require a very high tensile strength and high resistance to creep at the elevated temperatures where standard carbon or mild steel elements would not be up to the challenge. Resistance to shaft deflection is taken into consideration in material selection to ensure a long service life for the motor shaft 22. The shaft portions 78, 80 may be fabricated separately and assembled prior to installation. In one embodiment, the motor housing shaft portion 78 may have a splined male end 82 that is inserted into a splined bore 84 of the exterior shaft portion 80, with the splines of the male end 82 and the bore 84 meshing and engaging so that the shaft portions 78, 80 rotate together. Due to the operation in extreme heat conditions, one or both shaft portions 78, 80 may include heat dissipation bores 86 drilled through the shaft portions 78, 80 transverse to the longitudinal axis 76. The heat dissipation bores 86 increase the exposed surface area of the motor shaft 22 that allow heat to be communicated to the atmosphere surround the motor shaft 22.

The motor shaft 22 is mounted to the motor housing 12 for rotation using appropriate rotational bearings. The fixed shaft bearing 46 discussed above is disposed proximate the mounting flange 16, and is accessible through the circular opening 48 of the mounting flange 16 when the electric motor 10 is not installed. In one embodiment, the fixed shaft bearing 46 may be a pillow block bearing. Bearings such as pillow block bearings may allow rotation of the motor shaft 22 while forming a seal to prevent unwanted contaminants from entering the motor housing 12 from the high temperature environment. An annular bearing mounting flange 92 may be connected to and extend inward from the housing wall inner surface 72. The fixed shaft bearing 46 may have an outer housing that is press fit into, welded to or otherwise connected to the bearing mounting flange 92 to center the fixed shaft bearing 46 within the motor housing 12.

At the opposite end of the motor housing 12 proximate the closed end flange 18, a floating shaft bearing 94 may be mounted within the end bell 24 of the motor housing 12. The floating shaft bearing 94 may be any appropriate ball bearing for the motor shaft 22. Even with the cooling jacket 32 removing heat from the motor housing 12, the motor shaft 22 may still deflect due to natural flexing motion caused by rotational and centrifugal forces applied due to the inertia of the impeller. The motor shaft 22 may also experience some thermal expansion due to heat transferred from the high temperature environment, as well as heat generated from rotational loading and power transmission friction from the electric current flowing through the rotor 74 mounted on the motor shaft 22. To allow for thermal expansion of the motor shaft 22, the floating shaft bearing 94 is engaged by the end bell 24 in a manner that allows axial movement of the floating shaft bearing 94 as the motor shaft 22 expands and contracts. In the illustrated embodiment, for example, the floating shaft bearing 94 may have a axial expansion slot 96 defined in an outer surface, such as an outer surface of an outer race. The end bell 24 may have a corresponding threaded expansion set screw bore 98 drilled through from an outer surface to an inner surface. The expansion set screw bore 98 receives an expansion set screw 100 therein. The expansion slot 96 may have a circumferential width wide enough to receive an end of the expansion set screw 100. During installation, the expansion slot 96 may be aligned with the expansion set screw bore 98, and the expansion set screw 100 may be screwed into the expansion set screw bore 98 with the tip being received within the expansion slot 96, but not tightened to the point of preventing axial movement of the floating shaft bearing 94. The expansion slot 96 may have an axial length and an axial position that allows the floating shaft bearing 94 to move axially with the expansion and contraction of the motor shaft 22 without the expansion set screw 100 engaging the longitudinal ends of the expansion slot 96 and restricting movement. At the same time, the expansion set screw 100 will engage lateral sides of the expansion slot 96 to substantially rotation of the floating shaft bearing 94 about the longitudinal axis 76. Alternative mechanisms for allowing axial movement of the floating shaft bearing 94 while preventing rotation will be apparent to those skilled in the art and are contemplated by the inventor. This arrangement can prolong the life of the floating shaft bearing 94 as the motor shaft grows linearly from deflection rather than binding the bearings in the races of the ball bearings and causing thrust loads, additional friction, misalignment and overheating of the floating shaft bearing 94 in a preloaded condition as the motor shaft 22 expands.

Grease or other coating materials, if introduced within the motor housing 12, may adhere to or coat the stator 70 and/or the rotor 74. By coating the electric components 70, 74, the grease or coating material may act as a thermal insulator that seals in heat and create a risk of causing the electric motor 10 to overheat. Consequently, because the floating shaft bearing 94 has potential to leak grease or coating material, a radial restriction bushing and/or lip seal 104 may be installed between the floating shaft bearing 94 and the components 70, 74. In the illustrated embodiment, the lip seal 104 is press fit into the base of the end bell 24 in which the floating shaft bearing 94 is installed. However, the lip seal 104 may be installed at any other location where it can prevent fluids from the floating shaft bearing 94 from leaking into the motor housing 12.

Installation of the end cap 26 substantially seals the interior of the motor housing 12 from the ambient atmosphere surrounding the electric motor 10. The end cap 26 may include a grease fitting 106 similar to the grease fitting 44 proximate the mounting flange 16 for providing lubricant to the floating shaft bearing 94 without removing the end cap 26. The grease fittings 44, 106 contain dust caps that prevent gas from entering or escaping the motor housing 12. The dust caps are in place during normal operation. At service or lubrication, the dust caps are unscrewed and removed, making a standard grease gun accessible to add the appropriate lubricant. After servicing, the dust caps are reinstalled to reseal the motor housing 12. In addition to welds between mating parts, the motor housing 12 will include other sealing mechanisms as necessary at locations to seal the motor housing 12 from the ambient atmosphere. However, in some implementations, contaminants from the high temperature environment may flow past the fixed shaft bearing 46 and into the interior of the motor housing 12. The contaminants can include gases such as ammonia that are corrosive to the materials of the stator 70 and the rotor 74 and do damage that may impact the performance of the electric motor 10. In such embodiments, the end bell 24 may include an inert gas purge port 108 (FIG. 3) that is in fluid communication with the interior of the motor housing 12. The inert gas purge port 108 may be connected to a source (not shown) of pressurized inert gas that will not react with and corrode the stator 70 and the rotor 74. The inert gas can be pumped into the interior of the motor housing 12 to raise the internal pressure to a point that is greater than the pressure at the outer side of the fixed shaft bearing 46. The internal pressure created by the inert gas will keep the unwanted contaminants from infiltrating the interior of the motor housing 12. When inert gas purging is not needed, the inter gas purge port 108 may be plugged to hermetically seal the interior of the motor housing 12 from the ambient atmosphere.

The interior of the cooling jacket 32 is also shown in FIG. 4. A housing wall outer surface 110, a jacket wall inner surface 112, the mounting flange 16, the jacket end wall 36 and the cutout end wall 42 define a cooling jacket cavity 114 through which the cooling fluid will flow from the fluid inlet port 50 to the fluid outlet port 52. As shown, the cooling jacket cavity 114 extends from the mounting flange 16 to a point where substantially all of the stator 70 and the rotor 74 are encircled by the cooling jacket 32. In alternative embodiments, the cooling jacket 32 may extend further or shorter to meet the heat transfer requirements for a particular implementation of the electric motor 10. The cooling fluid may be any fluid having heat transfer properties sufficient to remove the required heat from the motor housing 12. Where no source of liquid coolant is available, pressurized air may function as the coolant fluid to create airflow over the housing wall outer surface 110. In most applications, pressurized water functions as the coolant fluid and is pumped through the cooling jacket cavity 114. In alternative embodiments, other liquid coolants such as polyalkylene glycol (PAG), cutting fluid, oils, other waterless coolants and the like may be used to achieve a desired level of heat transfer.

Due to the positioning of the fluid inlet port 50 at the bottom and the fluid outlet port 52 at the top of the cooling jacket 32 as described above, the coolant such as water will flow through and substantially fill the entire cooling jacket cavity 114 with minimal air gaps forming. In some implementations, it may be desirable to promote coolant fluid flow through a particular path within the cooling jacket cavity 114 that increases fluid flow over the housing wall outer surface 110. In the illustrated embodiment, the coolant flow through the cooling jacket cavity 114 is facilitated by a first flow control ring 120 and a second flow control ring 122. In this embodiment, the cutout end wall 42 may be a portion of the second flow control ring 122 at the cutout portion 38 of the jacket wall 34. In alternative embodiment, the cutout end wall 42 and the second flow control ring 122 may be separate components. The first flow control ring 120 is annular and is installed proximate to and downstream of the fluid inlet port 50. The first flow control ring 120 extends from the housing wall outer surface 110 to the jacket wall inner surface 112. The second flow control ring 122 is also annular and is installed between the first flow control ring 120 and the fluid outlet port 52. The flow control rings 120, 122 extend from the housing wall outer surface 110 to the jacket wall inner surface 112 and are connected so that there is minimal to no fluid flow between the flow control rings 120, 122 and the surfaces 110, 112.

Figure 5A:
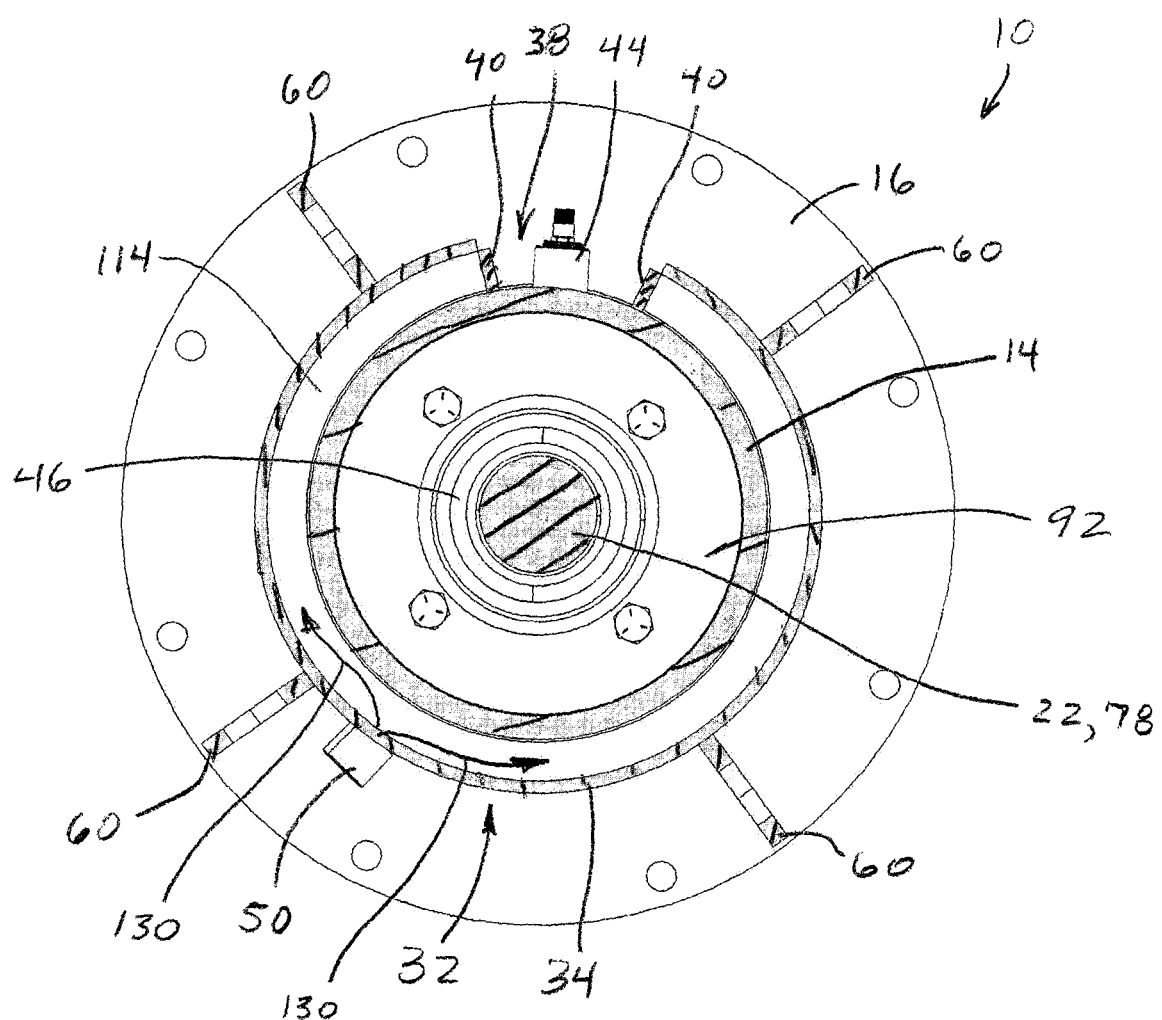
FIG. 5A is a cross-sectional view of the electric motor of FIG. 1 taken through line 5A-5A of FIG. 4.
Figure 5B:
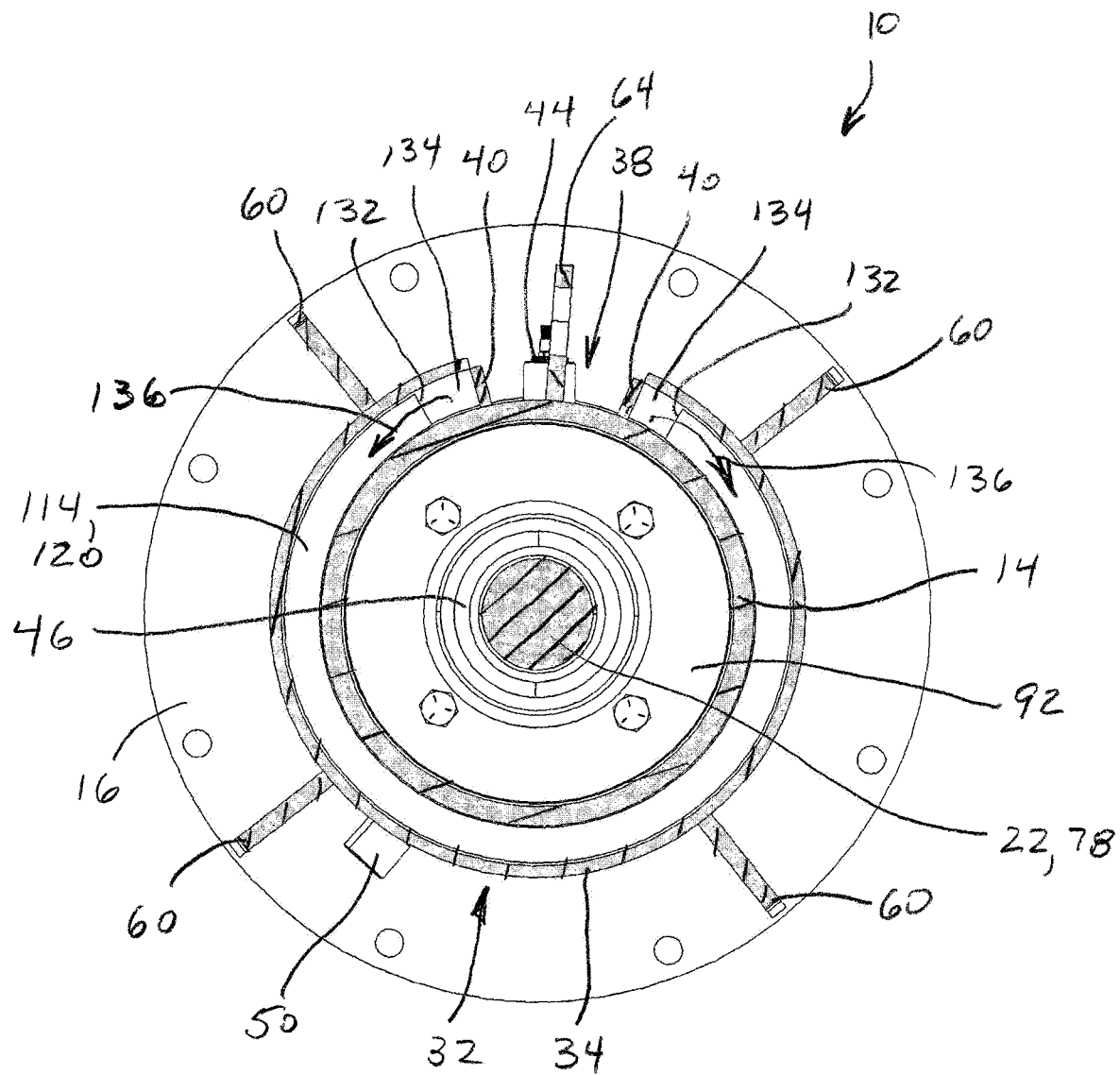
FIG. 5B is a cross-sectional view of the electric motor of FIG. 1 taken through line 5B-5B of FIG. 4.
Figure 5C:
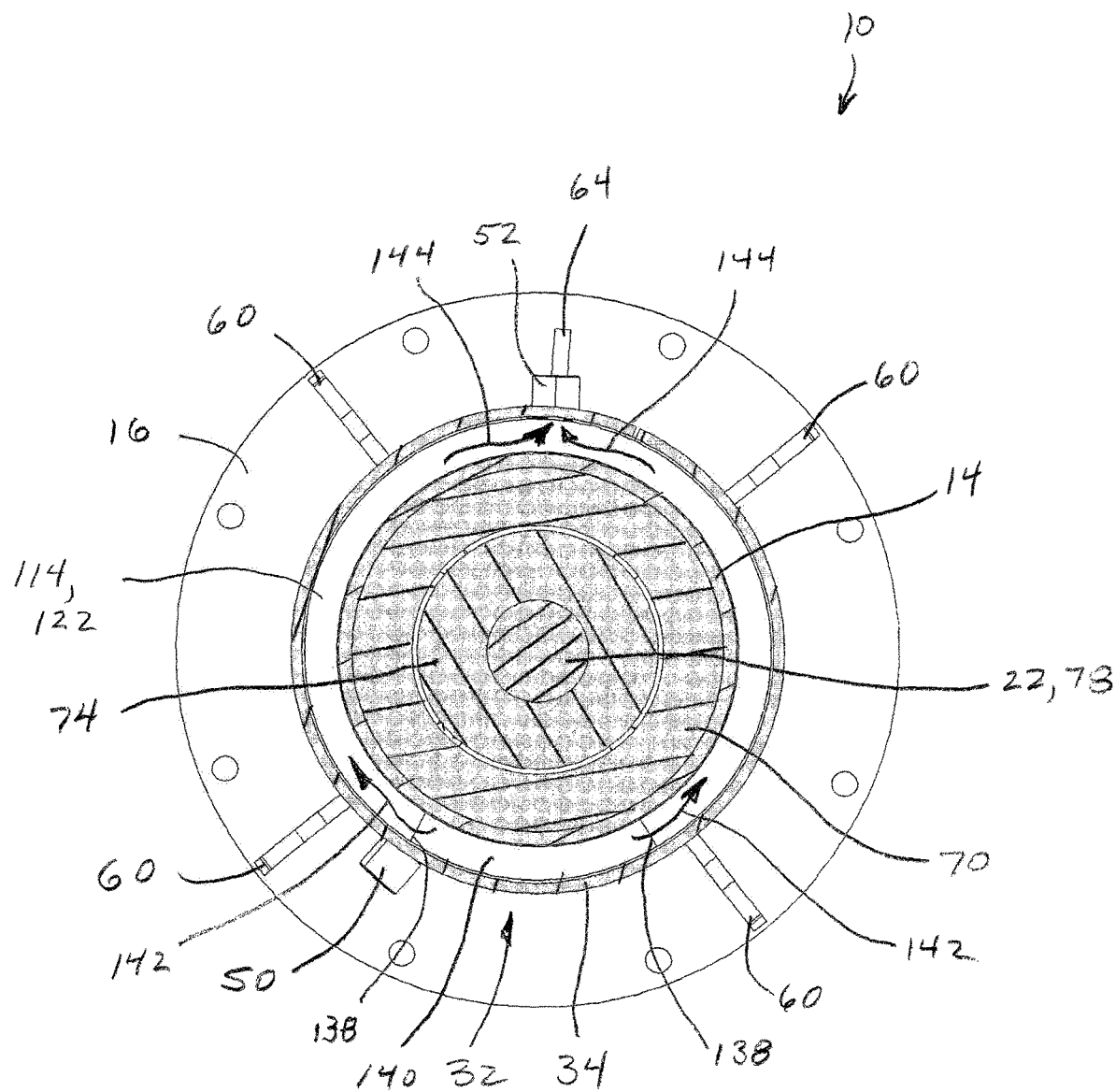
FIG. 5C is a cross-sectional view of the electric motor of FIG. 1 taken through line 5C-5C of FIG. 4.

Fluid flow within the cooling jacket cavity 114 from the fluid inlet port 50 to the fluid outlet port 52 may take a serpentine or winding path by the provision of flow openings in the flow control rings 120, 122 as illustrated in the sequence of FIGS. 5A-5C. FIG. 5A is a cross-section perpendicular to the longitudinal axis 76 taken between the fluid inlet port 50 and the first flow control ring 120. Arrows 130 indicate fluid flow into the cooling jacket cavity 114 through the fluid inlet port 50 proximate the bottom of the cooling jacket 32. The first flow control ring 120 initially constrains the cooling fluid to flow between the mounting flange 16 and the first flow control ring 120, around the housing wall and upward toward the cutout portion 38 of the jacket wall 34. This arrangement provides the coldest cooling fluid directly to the hottest area of the motor housing 12, which is typically at the base or mount of the motor housing 12, to achieve the greatest thermal efficiency in the cooling jacket 32. As seen in FIG. 5B, which is taken between the first flow control ring 120 and the second flow control ring 122, the first flow control ring 120 has an arcuate section removed at the top to accommodate the cutout portion 38 and to provide space between ends 132 and the corresponding cutout side walls 40 to form first flow control openings 134. The first flow control openings 134 allow the cooling fluid that flowed upward from the fluid inlet port 50 between the mounting flange 16 and first flow control ring 120 to flow past the first flow control ring 120 as indicated by arrows 136 and into the area between the flow control rings 120, 122. In this area, the cooling fluid flows downward around the housing wall 14. In alternative configurations where the cutout portion 38 is omitted and the jacket wall 34 encircles the housing wall 14 in that area, the cutout portion of the first flow control ring 120 may be smaller to provide a single smaller first flow control opening 134.

FIG. 5C is taken downstream of the fluid outlet port 52 and shows the area of the cooling jacket cavity 114 between the second flow control ring 122 and the jacket end wall 36. The second flow control ring 122 has an arcuate section removed at the bottom to provide space between ends 138 to form a second flow control opening 140. The second flow control opening 140 allows the cooling fluid that flowed downward from the first flow control openings 134 between the flow control rings 120, 122 to flow past the second flow control ring as indicated by arrows 142 and into the area between the second flow control ring 122 and the jacket end wall 36. In this area, the cooling fluid flows upward around the housing wall 14 and out through the fluid outlet port 52 as indicated by arrows 144.

Alternative arrangements for controlling fluid flow through the cooling jacket cavity 114 are contemplated. For example, additional flow control rings may be added to achieve a desired flow path around the housing wall 14. Also, as an alternative to cutting out sections of the flow control rings 120, 122, the flow control rings 120, 122 may be continues circles and have flow control apertures through the flow control rings 120, 122 that are positioned during assembly to allow cooling fluid to pass flow though the flow control apertures and past the flow control rings 120, 122 at prescribed locations to achieve the desired fluid flow. Further alternative embodiments are contemplated by the inventors as having use in electric motors 10 and cooling jackets 32 in accordance with the present disclosure.

Figure 6:
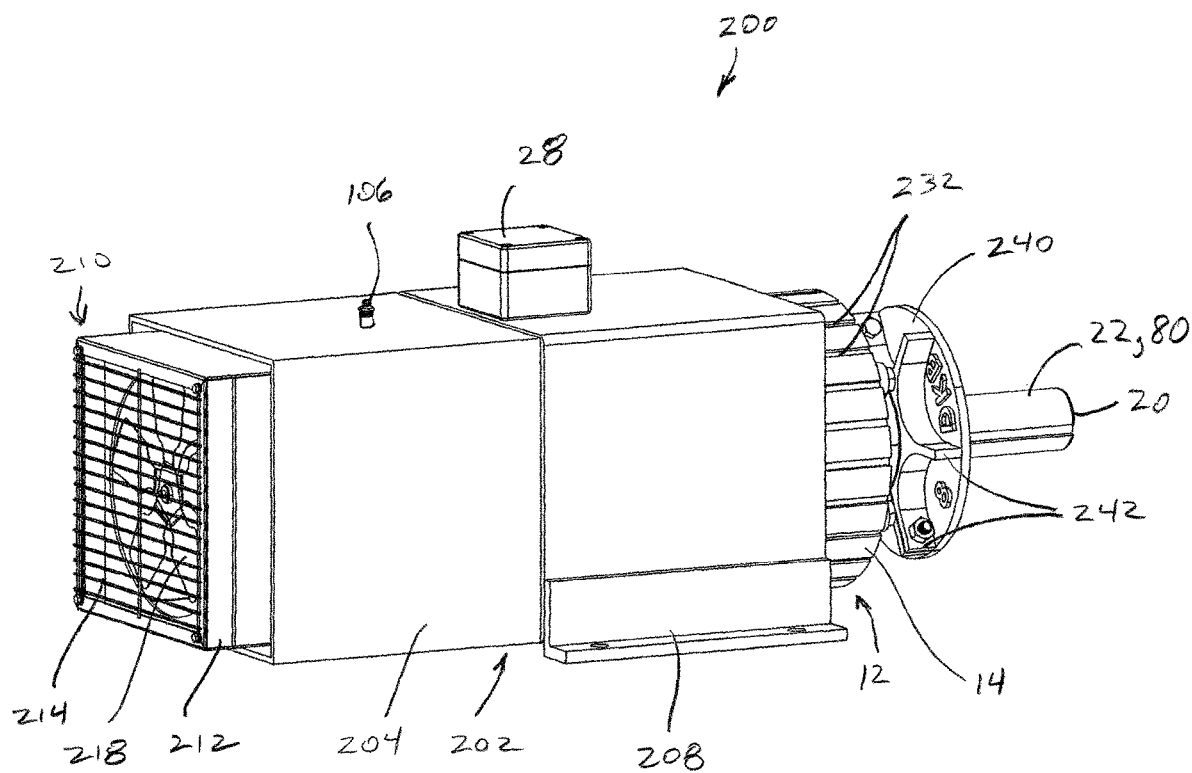
FIG. 6 is an isometric view of an electric motor including a second embodiment of fluid cooling in accordance with the present disclosure.
Figure 7:
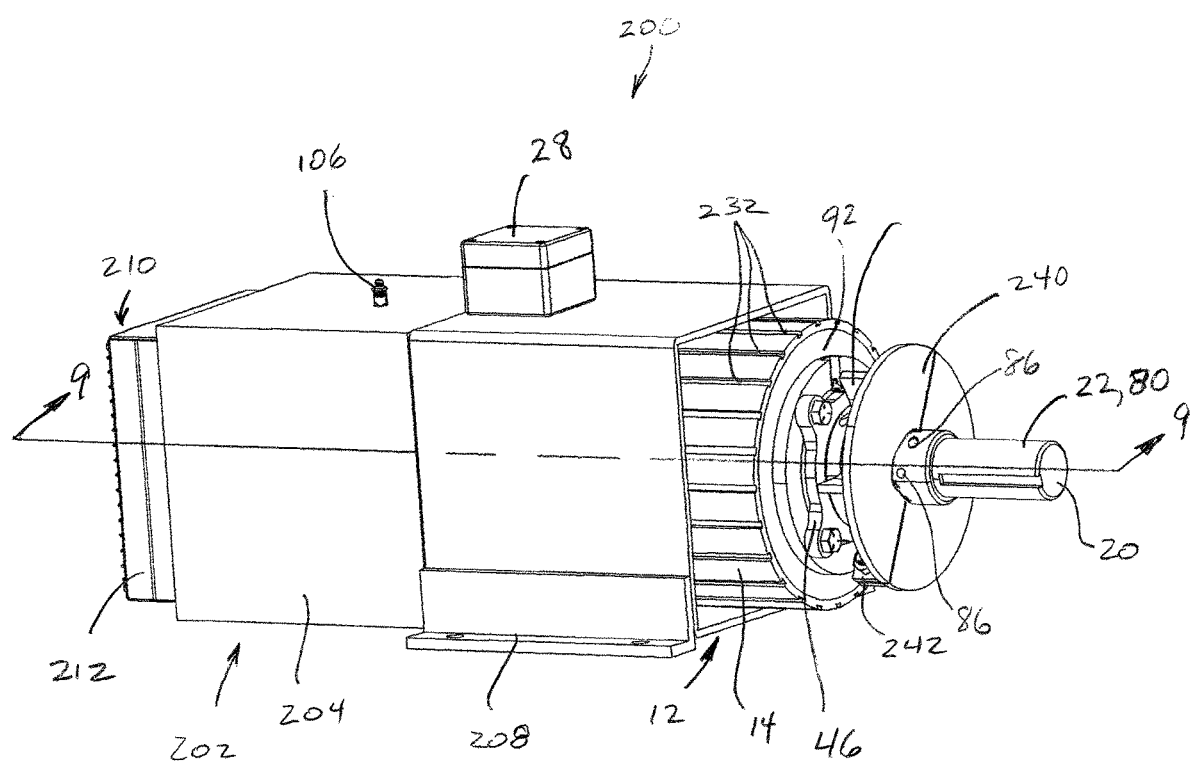
FIG. 7 is a second isometric view of the electric motor of FIG. 6.
Figure 8:
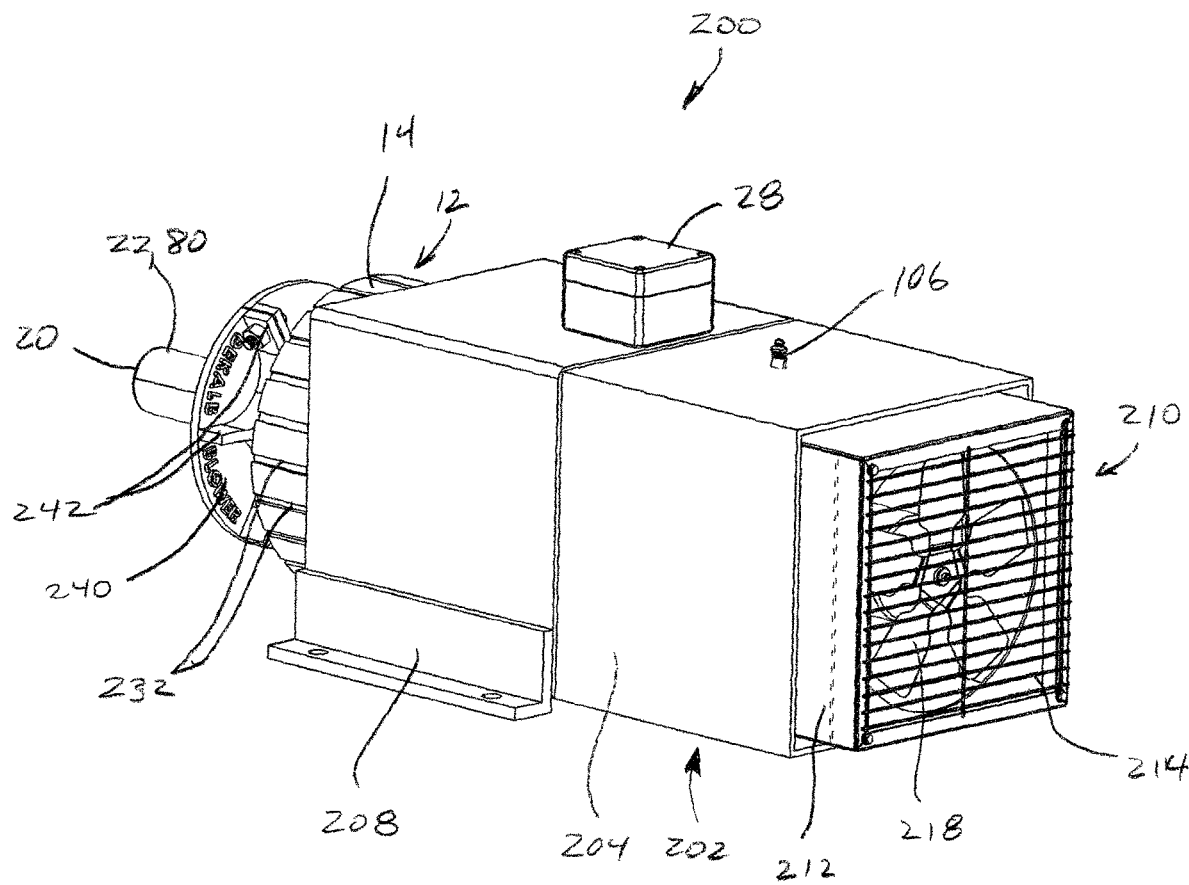
FIG. 8 is a third isometric view of the electric motor of FIG. 6.

FIGS. 6-8 illustrate isometric views of a second embodiment of an electric motor 200 with fluid cooling in accordance with the present disclosure. The electric motor 200 is also a standard 3 phase A/C induction motor with many elements in common with the electric motor 10. In the drawing figures and the following discussion, similar components between the embodiments are identified by the same reference numerals. Previous discussion of the similar components for the electric motor 10 have equal application to the electric motor 200 except where noted in the following discussion. Many of the differences in the embodiments relate to the cooling mechanisms.

Figure 9:
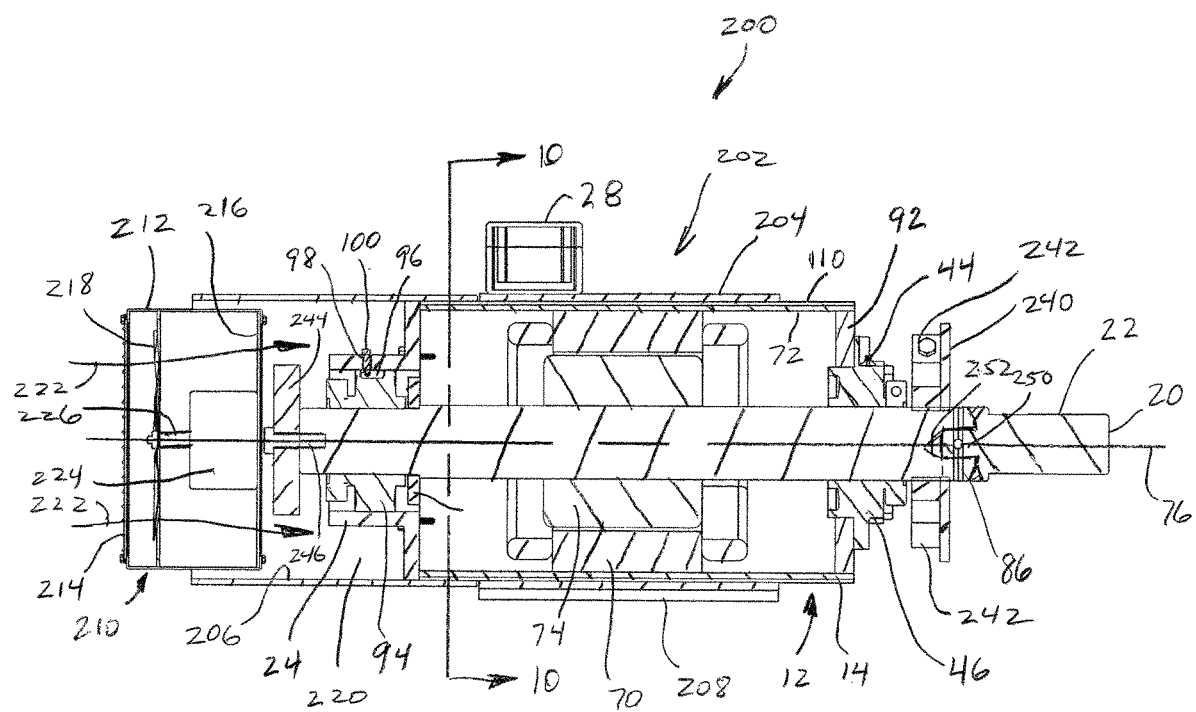
FIG. 9 is a cross-sectional view of the electric motor of FIG. 6 taken through line 9-9 of FIG. 7.
Figure 10:
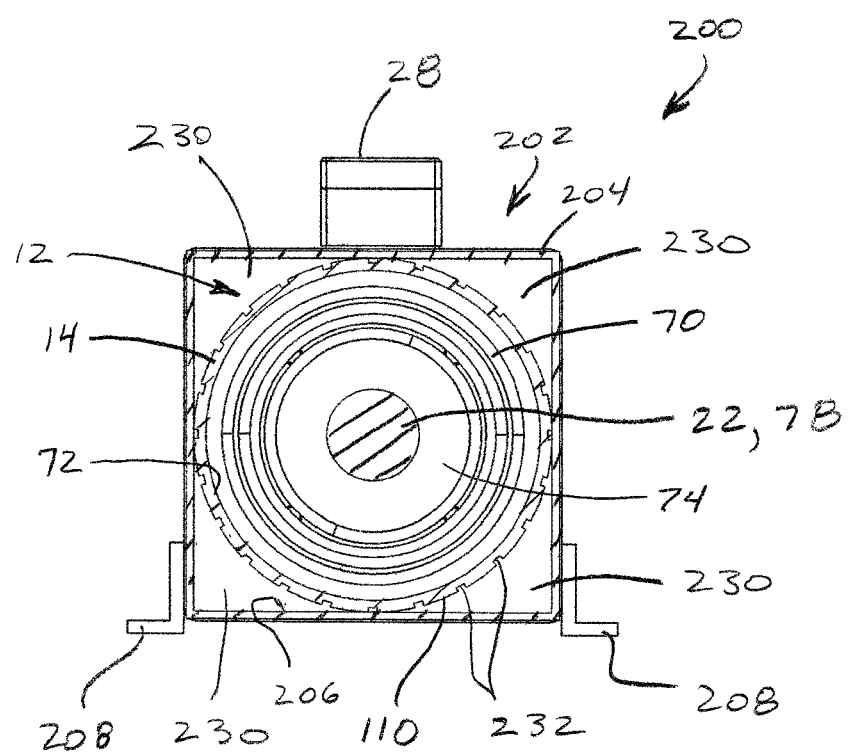
FIG. 10 is a cross-sectional view of the electric motor of FIG. 6 taken through line 10-10 of FIG. 9.

The electric motor 200 is ideal for similar applications as the liquid-cooled electric motor 10, but may have particular application in environments where sources for water or other cooling liquids are not available or less feasible to use. For these environments, the electric motor 200 includes a cooling jacket 202 that can keep airflow concentrated tightly around the motor housing 12. The cooling jacket 202 has a jacket wall 204 surrounding and concentric with the motor housing 12. The cooling wall 204 may be substantially square in cross-section and dimensioned so that a jacket inner surface 206 fits tightly around the housing wall outer surface 110 of the housing wall 14 as shown in FIGS. 9 and 10. The electric motor 200 is foot mounted and includes foot brackets 208 mounted on either side of the jacket wall 204 proximate the bottom of the electric motor 200.

The jacket wall 204 is open at both ends to facilitate airflow in the longitudinal direction over the housing wall outer surface 110. The airflow is provided by an integral direct drive fan 210 mounted on the cooling jacket 202 at an end opposite the shaft end 20. The fan 210 has a fan housing 212 with a complimentary shape to the jacket wall 204 for insertion in the open end. A fan grate 214 provides a protective cover at an inlet side of the fan 210, and an aperture fan discharge wall 216 (FIG. 9) at an outlet side of the fan 210 allows airflow produced by fan blades 218 to enter a cooling jacket cavity 220 as indicated by arrows 222 in FIG. 9. A fixed frequency fan motor 224 is mounted to the fan discharge wall 216, with the fan blades 218 being mounted on a fan shaft 226 extending from the fan motor 224. The fan motor 224 may typically be synchronous to 1800 RPM or 3600 RPM to provide a constant cooling airflow at a flow rate targeted to maximize cooling efficiency.

The fan motor 224 allows the fan 210 to be operated independent of the electric motor 200 and the rotation of the motor shaft 22. Consequently, the fan speed is adjustable to achieve a desired airflow 222 and heat transfer from the motor housing 12. The airflow 222 in the cooling jacket cavity 220 flows around the motor housing 12 in four fluid flow channels 230 (FIG. 10) defined by the jacket wall inner surface 206 at corners of the jacket wall 204 and corresponding portions of the housing wall outer surface 110 of the housing wall 14. Of course, the jacket wall 204 may have other geometries such as necessary to achieve desired airflow over the housing wall outer surface 110. Heat transfer to the exterior of the motor housing 12 is further facilitated by milling longitudinal slots or grooves 232 in the housing wall outer surface 110. The grooves 232 increase the surface area over which the air flows within the fluid flow channels 230 to draw more heat from the motor housing 12.

The electric motor 200 implements additional structures for keep heat from the high temperature environment or generated by the electric motor 200 from conducting or transferring up the motor shaft 22 to the critical components within the motor housing 12. For example, the cross-drilled heat dissipation bores 86 in the motor shaft 22 proximate the shaft end 20 and the high temperature environment remove mass from the center of the motor shaft 22. The reduced cross-sectional area of the motor shaft 22 reduces the heat transfer rate at the heat dissipation bores 86 while also providing increased exposed surface area for loss of heat to the surrounding atmosphere. Also proximate the shaft end 20, a first heat slinger 240 is mounted on the motor shaft 22 and rotates with the motor shaft 22. The first heat slinger 240 may be fabricated from a thermally conductive material such as aluminum and have a plurality of slinger fins 242. The first heat slinger 240 thermally connects the motor shaft 22 to the surrounding ambient atmosphere. As the motor shaft 22 and the first heat slinger 240 rotate, the first heat slinger 240 dissipates heat outward from the slinger fins 242. The first heat slinger 240 may also provide cooling to the fixed shaft bearing 46 as the motor shaft 22 rotates and the In this embodiment in contrast to the electric motor 10, the motor housing 12 is not mounted to a wall of the high temperature environment in a manner that forms a gas tight or hermetic seal as can be formed with the mounting flange 16 of the electric motor 10. Instead, the fixed shaft bearing 46 may be relied upon to hermetically seal the motor housing 12. In one embodiment, the fixed shaft bearing 46 may be a rotary shaft seal of the type disclosed in U.S. Pat. No. 10,054,130 that issued on Aug. 21, 2018, and which is expressly incorporated by reference herein. Bearings such as rotary shaft seal may allow rotation of the motor shaft 22 while forming a seal to prevent unwanted contaminants from entering the motor housing 12 from the high temperature environment. The rotary shaft seal can provide isolation of the motor housing 12 from high temperature and/or chemically induced corrosive environments while allowing rotation of the motor shaft 22 extending there through. The effectiveness of the rotary shaft seal may be increased by pressurizing the seal housing bore to suppress leakage of gases through the shaft seal using a neutral or non-contaminating gas or lubricant. The pressurization can prevent leakage of hazardous gases from the high temperature or corrosive environment to the motor housing 12.

A second heat slinger 244 (FIG. 9) may be incorporated on the motor shaft 22 on the opposite side of the motor housing 12. The second heat slinger 244 may be mounted on the motor shaft 22 by a slinger bolt 246 threaded into a bore in the end of the motor shaft 22 in a manner that facilitates rotation of the second heat slinger 244 with the motor shaft 22. As heat is generated from the electric current flowing through the stator 70 and the rotor 74, heat is absorbed by the motor shaft 22. The integral second heat slinger 244 provides an alternate dissipation path for the heat than being transferred or conducted to the floating shaft bearing 94, the end bell 24 or other bearing support structure. As heat is conducted through the core of the material of the motor shaft 22, the cooling provided by the heat slingers 240, 244 will provide a much lower thermal equilibrium set point. The heat slingers 240, 244 on both ends of the motor shaft 22 can also act as a balancing or dynamic balancing means in the event the mass of the rotor 74 becomes unbalanced and is not easily accessible after the motor housing 12 is sealed. This may be particularly important in high RPM applications where increased amplitude levels can wear out the equipment faster. Weights may be added or removed from the heat slingers 44, 106 on either or both ends of the motor shaft 22 to balance the electric motor 200 to ISO standards prior to completing the assembly or maintenance of the electric motor 200 and installing the impeller.

The illustrated embodiment also provides an alternative mechanism for connecting the shaft portions 78, 80 of the motor shaft 22. As shown in FIG. 9, the exterior shaft portion 80 has a nipple 250 that is received by a bore 252 of the motor housing shaft portion 78 to align the shaft portions 78, 80. The facing surfaces of the shaft portions 78, 80 are chamfered at the edges and welded at the seam to form a secure connection. After welding, the weld is sanded down to make a smooth, continuous surface along the motor shaft 22. The attachment mechanisms illustrated and described herein are exemplary, and those skilled in the art will understand that alternative connections are possible and contemplated by the inventor.

INDUSTRIAL APPLICABILITY

The various electric motor designs in accordance with the present disclosure can improve cooling of the components of the electric motor and the overall performance of the electric motors. Electric motors in accordance with the present disclosure may have use in implementations where hermetic or gas tight sealing arrangements are required, but still require a rotating medium such as a fan impeller. The electric motors may be used in vacuum heat treating vessels or in environments containing toxic or explosive gases such as hydrogen that is explosive if exposed to oxygen, or outside ambient atmosphere or ammonia that is corrosive to copper. The direct drive assembly of the electric motors, when coupled with the appropriate fan blade or impeller, can act as a cooling fan or a recirculating fan for these vessels and environments where standard fan or rotary sealing arrangements will not suffice.

Also, typically air cooled models are ideal where belt driving the impeller becomes a maintenance issue or controlling the motor through a VFD controller is required or ideal to control the fan or impeller performance on the fan shaft. By direct driving the impeller. Some processes require multiple or a plethora or fan RPMS to control performance of the fan while the product or process is being maintained, such as glass tempering, or when providing an air or cooling quench to the processed parts is needed for only a period of time and not continuous. This can be done using the direct drive motor where utilizing standard method of belts and pulley and operating at low or high turndown on the motor will not provide sufficient motor cooling rates to the TEFC frame motor being used, as this type of cooling method on this motor, the cooling fan located within the TEFC motor operates at the same synchronous speed as the motor turning. Not ideal for slow RPM or large turndown.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An electric motor comprising:
   a housing wall having a cylindrical shape, a housing wall inner surface and a housing wall outer surface;
   a stator mounted to the housing wall inner surface;
   a motor shaft mounted for rotation within the housing wall; and
   a cooling jacket wall surrounding and concentric with the housing wall and having a jacket wall inner surface and a jacket wall outer surface, wherein the cooling jacket wall further includes a cutout portion extending axially from a first jacket wall end of the cooling jacket wall and providing access to a corresponding portion of the housing wall outer surface and a cutout wall extending from the cooling jacket wall to the housing wall outer surface, wherein the housing wall outer surface and the jacket wall inner surface define a cooling jacket cavity, and wherein the cooling jacket wall has a fluid inlet port proximate the first jacket wall end and a fluid outlet port proximate a second end of the cooling jacket wall, with the fluid inlet port positioned below the fluid outlet port, and cooling fluid flows into the cooling jacket cavity through the fluid inlet port, flows through the cooling jacket cavity over the housing wall outer surface and flows out of the cooling jacket cavity through the fluid outlet port.

2. The electric motor of claim 1, comprising: a first flow control ring having an annular shape and extending between the housing wall outer surface and the jacket wall inner surface, and having a first flow control opening allowing cooling fluid to flow past the first flow control ring, wherein the first flow control ring is positioned between the fluid inlet port and the fluid outlet port; and
   a second flow control ring having an annular shape and extending between the housing wall outer surface and the jacket wall inner surface, and having a second flow control opening allowing cooling fluid to flow past the second flow control ring, wherein the second flow control ring is positioned between the first flow control ring and the fluid outlet port so that cooling fluid entering the cooling jacket cavity through the fluid inlet port flows through the first flow control opening, through the second flow control opening and then out of the cooling jacket cavity through the fluid outlet port.

3. The electric motor of claim 2, wherein the first flow control opening is disposed above the fluid inlet port and the second flow control opening is disposed below the first fluid control opening.

4. The electric motor of claim 3, wherein the first flow control opening is disposed diametrically opposite the second flow control opening within the cooling jacket cavity.

5. The electric motor of claim 2, wherein the first flow control opening is defined between a first flow control ring end and a corresponding portion of the cutout wall.

6. The electric motor of claim 2, wherein the first flow control opening comprises a pair of first flow control openings wherein each of the pair of first flow control openings is defined between a first flow control ring end and a corresponding portion of the cutout wall.

7. The electric motor of claim 2, wherein the cutout wall comprises a cutout end wall that is a portion of the second flow control ring.

8. The electric motor of claim 1, wherein the motor shaft comprises:
- a motor housing shaft portion disposed within the housing wall with a rotor mounted thereon, wherein the motor housing shaft portion is fabricated from an electrically conductive material; and
- an exterior shaft portion connected to the motor housing shaft portion and disposed outward of an end of the housing wall, wherein the exterior shaft portion is fabricated from material having a melting point greater than 2200° F.

9. The electric motor of claim 1, wherein the fluid inlet port is positioned below the cutout portion.

10. An electric motor comprising:
- a housing wall having a cylindrical shape, a housing wall inner surface and a housing wall outer surface;
- a stator mounted to the housing wall inner surface;
- a motor shaft mounted for rotation within the housing wall;
- a cooling jacket wall surrounding and concentric with the housing wall and having a jacket wall inner surface and a jacket wall outer surface, wherein the cooling jacket wall further includes a cutout portion extending axially from a first jacket wall end of the cooling jacket wall and providing access to a corresponding portion of the housing wall outer surface;
- a cutout wall extending from the cooling jacket wall to the housing wall outer surface;
- a first jacket end wall connected to the jacket wall proximate the first jacket wall end and to the housing wall; and
- a second jacket end wall connected to the jacket wall proximate a second jacket wall end and to the housing wall, wherein the housing wall outer surface, the jacket wall inner surface, the first jacket end wall and the second jacket end wall define a cooling jacket cavity, and wherein the cooling jacket wall has a fluid inlet port proximate the first jacket end wall and a fluid outlet port proximate the second jacket end wall and cooling fluid flows into the cooling jacket cavity through the fluid inlet port, flows through the cooling jacket cavity over the housing wall outer surface and flows out of the cooling jacket cavity through the fluid outlet port.

11. The electric motor of claim 10, wherein the fluid inlet port is positioned below the fluid outlet port.

12. The electric motor of claim 11, comprising: a first flow control ring having an annular shape and extending between the housing wall outer surface and the jacket wall inner surface, and having a first flow control opening allowing cooling fluid to flow past the first flow control ring, wherein the first flow control ring is positioned between the fluid inlet port and the fluid outlet port; and
- a second flow control ring having an annular shape and extending between housing wall outer surface and the jacket wall inner surface, and having a second flow control opening allowing cooling fluid to flow past the second flow control ring, wherein the second flow control ring is positioned between the first flow control ring and the fluid outlet port so that cooling fluid entering the cooling jacket cavity through the fluid inlet port flows through the first flow control opening, through the second flow control opening and then out of the cooling jacket cavity through the fluid outlet port.

13. The electric motor of claim 12, wherein the first flow control opening is disposed above the fluid inlet port and the second flow control opening is disposed below the first fluid control opening.

14. The electric motor of claim 13, wherein the first flow control opening is disposed diametrically opposite the second flow control opening within the cooling jacket cavity.

15. The electric motor of claim 12, wherein the first flow control ring has an arcuate section cut out from the first flow control ring, and where the first flow control opening is defined by a gap between ends of the first flow control ring from which the arcuate section was cut.

16. The electric motor of claim 12, wherein the first flow control opening is defined between a first flow control ring end and a corresponding portion of the cutout wall.

17. The electric motor of claim 12, wherein the first flow control opening comprises a pair of first flow control openings wherein each of the pair of first flow control openings is defined between a first flow control ring end and a corresponding portion of the cutout wall.

18. The electric motor of claim 12, wherein the cutout wall comprises a cutout end wall that is a portion of the second flow control ring.

19. The electric motor of claim 10, wherein the fluid inlet port is positioned below the cutout portion.

* * * * *